United States Patent [19]

Nochta

[11] Patent Number: 4,744,169
[45] Date of Patent: May 17, 1988

[54] FISHING LURE

[76] Inventor: George A. Nochta, 8654 Atlas View Dr., Santee, Calif. 92071

[21] Appl. No.: 944,194

[22] Filed: Dec. 22, 1986

[51] Int. Cl.$^4$ .............................................. A01K 85/00
[52] U.S. Cl. .................................. 43/42.31; 43/42.24
[58] Field of Search ................ 43/42.28, 42.29, 42.31, 43/42.35, 42.37

[56] References Cited

U.S. PATENT DOCUMENTS

| | | | |
|---|---|---|---|
| 1,792,989 | 2/1931 | La Gue | 43/42.31 |
| 2,488,678 | 11/1949 | Nardi | 43/42.31 |
| 2,741,864 | 4/1956 | Shotton | 43/42.31 |
| 3,040,462 | 6/1962 | Guida | 43/42.31 |
| 3,468,053 | 9/1969 | Lux | 43/42.31 |
| 3,757,455 | 9/1973 | Strader | 43/42.31 |
| 3,760,528 | 9/1973 | Moore | 43/42.24 |
| 3,802,115 | 4/1974 | Auten et al. | 43/42.31 |
| 3,831,307 | 8/1974 | Pittman | 43/42.31 |
| 3,848,353 | 11/1974 | McClellan | 43/42.31 |
| 3,877,168 | 4/1975 | Stevens | 43/42.31 |
| 3,894,350 | 7/1975 | Parker | 43/42.31 |
| 3,909,974 | 10/1975 | Kent | 43/42.31 |
| 3,935,660 | 2/1976 | Plew | 43/42.24 |
| 4,203,246 | 5/1980 | Sacharnoski, Sr. | 43/42.31 |
| 4,453,335 | 6/1984 | Smith | 43/42.31 |

Primary Examiner—M. Jordan
Attorney, Agent, or Firm—Brown, Martin, Haller & Meador

[57] ABSTRACT

A fishing lure comprises an elongate body of flexible plastics material having an internal sound producing device comprising at least one chamber of small dimensions containing a single ball. The relative dimensions of the ball and cavity are such that the ball is constrained against rattling against the walls of the cavity with movement of the lure and instead is guided to follow a rolling movement around the walls of the cavity, producing a sound frequency attractive to fish. The chamber is provided in a suitable lightweight plastics material capsule embedded in the lure body, and may be of circular dome or annular shape.

25 Claims, 2 Drawing Sheets

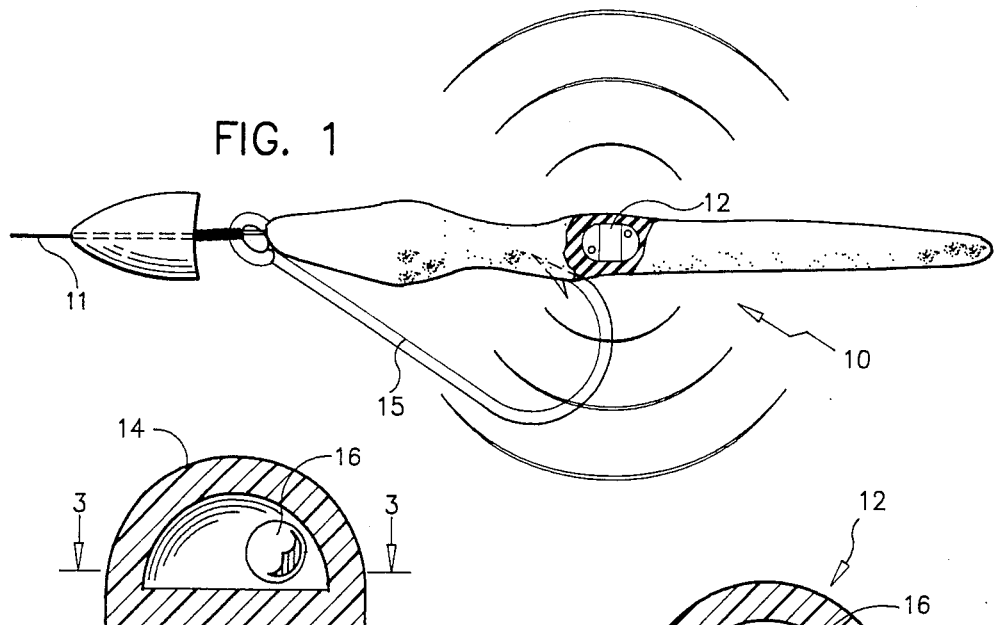
FIG. 1
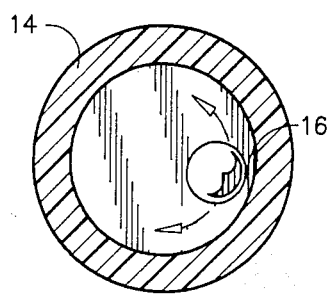
FIG. 2
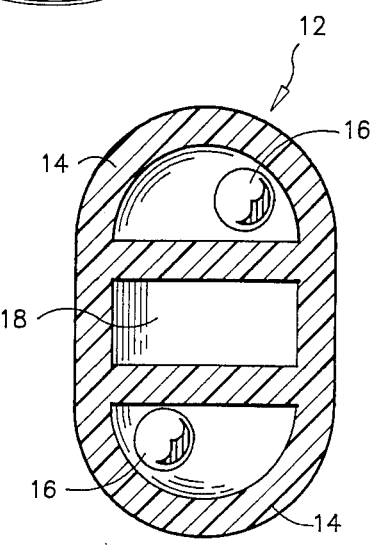
FIG. 3
FIG. 4
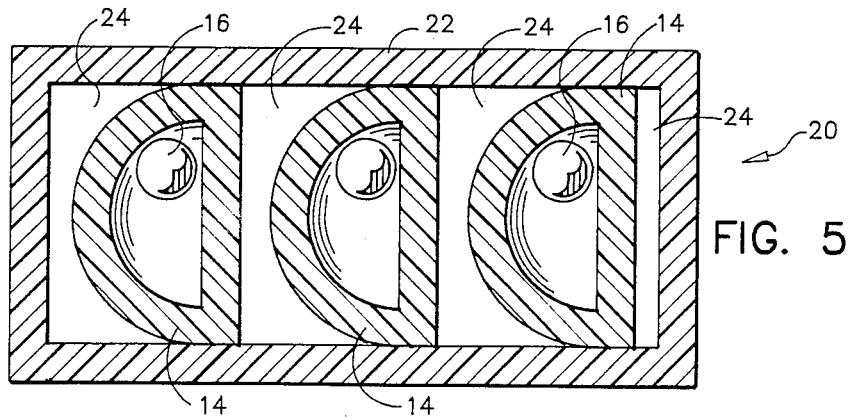
FIG. 5

FISHING LURE

BACKGROUND OF THE INVENTION

The present invention relates generally to artificial fishing lures of soft plastic material, and more particularly to fishing lures having internal, sound producing cavities for attracting fish.

Artificial fishing lures of soft plastic material generally formed into the shape of a worm or other suitable fish bait such as a grub or shad are well known. Such lures are of a soft plastic material which has a gelatin-like motion when stimulated by external movement, for example by water flowing over it. This produces a wiggling motion which can attract fish in a similar fashion to live bait.

Some soft plastic fishing lures of this type are provided with internal or external rattles to produce noise when the lure moves while immersed in water under normal fishing conditions. For example, U.S. Pat. No. 3,802,115 of Auten describes a noise making fishing lure in which a tubular glass container or capsule containing one or more metal balls is embedded in a cavity in an artificial, worm-shaped fishing lure. The balls are loosely contained in the capsule and will rattle against each other and the container walls as the lure moves in the water. In U.S. Pat. No. 3,760,528 of Moore a metal hollow chamber containing a freely movable metal ball is embedded in the head portion of an artificial lure. Again a rattling noise of the ball striking the walls of the chamber is produced as the lure is dragged through the water.

In U.S. Pat. Nos. 4,203,246 of Sacharonski, Sr., and 3,935,660 of Plew, similar fishing lures are described in which a tubular container of metal or glass containing one or more metal balls is embedded in the lure body. Again, a rattling or clicking noise is produced by the balls striking each other or the walls of the container when the lure is moved in the water.

This type of noise making fishing lure has a number of disadvantages. Firstly, the type of noise produced is not necessarily attractive to the fish. Fish have very sensitive hearing or sound detecting systems both for warning them of danger and for detecting the possible presence of food. Thus the type of sound or vibration which will attract predator fish must be closely similar to that made by their prey. Crawfish, minnows, worms, lizards, snakes and so on do not make rattling, banging or clanking noises as they move around underwater. Instead, they make subtle high frequency sounds as they scratch or breathe on a lake or river bed, or move around in large schools. Thus, rattling lures where hard metal contacts the walls of a metal or glass container are unlikely to duplicate or even closely resemble the more subtle, soft vibrations or sounds of actual predator fish prey. In fact, the noises made may be loud enough in some cases to simulate danger, causing fish to flee rather than approach the bait. Thus, although the rattling noises produced by these lures may attract fish from a distance, this sound in no way approaches the natural sounds produced by living crustaceans or bait fish, and the predator fish may either lose interest or even flee on closer contact.

Another problem with existing, noise-making fishing lures is that the noise making devices, being made of metal, glass and the like, are of relatively heavy and dense materials. This will actually greatly reduce or dampen the movement of the soft plastic lure in the water, reducing and damping the sound produced from the sound making chamber.

SUMMARY OF THE INVENTION

It is an object of the present invention to provide an artificial fishing lure which produces noises tending to attract fish to the lure.

According to the present invention an artificial fishing lure is provided which comprises a bait-shaped lure of soft plastic material having an internal chamber containing a single ball. The relative dimensions of the chamber and ball are such that the ball is constrained against rattling against the walls of the chamber and is instead guided to follow a rolling or spinning movement around the chamber walls. The chamber preferably comprises a capsule of suitable lightweight plastics material having an internal cavity containing the ball, the chamber being embedded in the lure either during molding of the lure body or subsequent to molding in a suitable cavity provided in the lure body.

The capsule may be of circular dome shape, disc-like shape or of an annular ring or donut shape, for example. In each case the dimensions of the internal cavity are such that the single ball is constrained against rattling against the walls of the cavity. For example, the axial height or length of the chamber may be no greater than twice the diameter of the ball. The overall chamber dimensions, and thus the weight of the chamber and ball, are relatively small so that the buoyancy of the lure is not reduced substantially by the embedded noise-producing capsule, and the lure will move naturally in use with movement through the water in much the same way as it would without the added capsule.

By constraining the ball to roll rather than rattle in the cavity, a different type of noise is produced. Rather than a relatively loud, low frequency rattling or clanking noise, a softer, higher frequency sound is produced as the ball whirls or spins against the chamber walls. The difference in the sounds can be understood by comparing the noises produced by bowling balls in a bowling alley, for example. If a player takes a bowling ball and drops it on the alley, or bangs two bowling balls together, a loud, banging noise is produced. If, however, the ball is simply rolled along the alley, a smooth, high frequency whirling sound is produced which is much gentler and more pleasant to the ears. This principle when applied to a fishing lure has been found to produce sounds which apparently approach those of natural bait much more closely, and the artificial lure employing such a sound producing device has been found to be more effective in attracting fish.

Where the chamber is of annular shape, the single ball will roll around the annular passageway defined by the chamber. In the preferred embodiment, the chamber is a lightweight plastic capsule and the ball is of metal, glass or plastics material. These materials have been found to produce suitable sounds when rolled against one another.

Since there is only a single ball and both the ball and chamber are small and lightweight, the chamber can be placed anywhere along the length of the lure without significantly damping the natural motions of the lightweight artificial lure in the water. Artificial fishing lures are normally made from soft, gelatin-like plastic material which have a gelatin-like motion on their surface when stimulated by external movement, for example, of surrounding water or on being dragged through the water. This in itself can be attractive to fish, and causes the movement of the chamber which generates the high frequency buzzing or rolling noise from the ball in the chamber. It is therefore important that the motion of the lure body is not damped significantly by the weight of the ball containing chamber.

In the preferred embodiment the capsule is small, lightweight and thin-walled, and is constructed to have good buoyancy when embedded in the fishing lure body, so that it will not dampen the motion of the body appreciably. Additionally, the chamber should be positioned in the area of maximum movement of the lure body, i.e. away from the hooks or lead weights used to fish the lure, so that it can take full advantage of the motion of the lure body to produce fish-attracting noises. Slight movement of the lure body as the result of normal water movement, and more intense movement produced by rod action, lure swimming, heavy tide flow or bottom contact, cause the lure to radiate high frequency buzz tones which can attract predator gamefish into attacking the lure.

In the preferred embodiment of the invention two or more such chambers each containing a single ball are embedded in the lure. Preferably, the chambers are laminated together with hollow, resonant air chambers for sound amplification located between each adjacent pair of ball containing chambers. This arrangement improves the amplification of the sound transmitted through the lure body to the surrounding water.

BRIEF DESCRIPTION OF THE DRAWINGS

The present invention will be better understood from the following detailed description of some preferred embodiments of the invention, taken in conjunction with the accompanying drawings, in which like reference numerals refer to like parts and in which:

FIG. 1 is a side elevational view of an artificial fishing lure according to one embodiment of the present invention, partially broken away to reveal the internal sound producing device;

FIG. 2 is a vertical cross-section through a first type of chamber for forming part of the sound producing device;

FIG. 3 is a horizontal section on the lines 3—3 of FIG. 2;

FIG. 4 is a vertical cross-section through one embodiment of a sound producing device incorporating chambers of the type shown in FIGS. 2 and 3;

FIG. 5 is a vertical cross-section through an alternative sound producing device incorporating chambers as shown in FIGS. 2 and 3;

DESCRIPTION OF THE PREFERRED EMBODIMENTS

Figure 6:
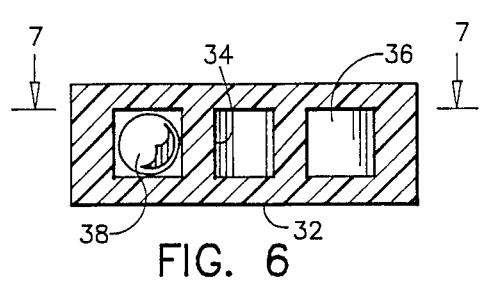
FIG. 6 is a vertical cross-section through a modified chamber for forming part of the sound producing device.

FIG. 1 of the drawings shows a fishing lure 10 with an internal sound producing device 12 according to a preferred embodiment of the invention embedded at a suitable point in the body of the lure. Lures of the types shown in FIG. 1 are conventionally made of a suitable soft, jellylike plastics material in the shape of a suitable predator fish prey, such as a worm as shown in FIG. 1, or any other suitable prey such as a crawfish, minnow, lizard, snake and so on. Although the lure is shown in FIG. 1 as having an elongate, worm-like shape, it will be clear that it may be made in any other suitable shapes and sizes which would tend to be attractive to the type of fish to be caught. The material generally used in manufacturing soft plastic fishing lures of this type is a soft vinyl known as Plastisol.

In use, the lure 10 is connected to a fishing line 11 and a conventional metal hook 15 is mounted at one end of the lure body with the pointed end of the hook within the body of the lure.

The sound producing device 12 may be embedded in the lure by molding it into the soft plastics material as the lure body is formed, or alternatively, it may be implanted in suitable cavities after the lure body is formed. It is preferably located in the position shown for maximum effect, i.e. at an intermediate point in the length of the lure body.

The sound producing device of this invention is made up of one or more chambers or cells 14 of suitable shape and dimensions, each containing a single ball 16 designed to roll around the walls of the chamber on movement of the lure body to produce a high frequency whirring or buzzing tone attractive to fish.

FIGS. 2 to 4 of the drawings illustrate one embodiment of a sound producing device according to the invention. FIGS. 2 and 3 illustrate the shape of the ball chamber 14 in this embodiment, which is a circular dome shape. The chamber is formed from a very light, thin plastic material and contains a single ball 16, which may be of lead, glass, or hard plastic material. In one example of a chamber of this type, the dome had walls of a thickness between 0.8 to 1 mm, and had a diameter of about 3 mm, and a height of about 2 mm, while the ball had a diameter of about 1 mm.

The shape and material of the chamber and the relative dimensions of the chamber and ball are specifically chosen so that, when the chamber is shaken or moved, the ball is constrained against rattling against the walls of the chamber and instead follows a spinning or rolling path around the chamber, as indicated by the arrows in FIG. 3. This produces an entirely different sound from that produced by a hard metal ball rattling against a metal chamber, for example. The sound produced is a high frequency whirring or buzzing noise similar to that produced by rolling a bowling ball down a bowling alley, for example, but will be at much higher frequency due to the scaled down size of the ball and chamber. This high frequency "whirring" sound is much more attractive to fish than a rattling or clicking noise as produced by a rattle-type noise producing lure, since it is much more similar to the sounds produced by natural prey.

A single chamber of the type shown in FIGS. 2 and 3 may be embedded in the fishing lure body. However, to produce greater amplification of the sound, two such chambers are preferably molded or laminated together as shown in FIG. 4, with hollow air filled chambers 18 between the adjacent ball chambers. FIG. 5 shows a modified sound producing device 20 in which three or more dome-shaped ball chambers can be provided, by incasing the chambers in a hollow air filled tube 22. Air gaps 24 are provided between the adjacent ball chambers and at opposite ends of the device. In each of the two embodiments of FIGS. 4 and 5, the provision of more than one ball chamber significantly amplifies the sound produced on movement of the device, and the air chambers between the ball chambers act as resonant cavities for further sound amplification, improving the transfer of sound through the body of the fishing lure in which the device is embedded.

It has been found that for dome shaped ball chambers of the dimensions given above, an air chamber having thickness of about 1 mm between adjacent chambers will provide good sound amplification effects. In the embodiment of FIG. 5 the tube may be of the same material and wall thickness as the dome chambers, and is preferably of length approximately 8 mm.

The sound producing devices shown in FIGS. 4 and 5 may be formed either by molding each of the ball and air chambers separately and then laminating them together, or alternatively the entire device shown could be formed in two separate parts, each comprising a longitudinal half section. The spheres or balls could then be loaded into the ball chamber cavities and the two parts suitably bonded or molded together to form the whole device. This is a similar technique to that used in the manufacture of baby rattles, for example. Alternatively, commercially available "moving eyeballs" may be used. These are plastic, dome-shaped capsules each containing a moving ball and are commonly used in arts and crafts and toy manufacture. However, they have been found to be of ideal size and dimensions for producing the sound producing devices of this invention.

The sound producing device is then suitably embedded in the body of a suitable soft plastic fishing lure, either during molding or after the lure is formed. If the device is to be embedded during the molding process, the plastics material used in making the device must be a lightweight, high temperature plastics material which will withstand the 340 to 370 degrees F. heat of the liquid plastic used in molding soft fishing lures. If the device is implanted after the lure has been molded and cooled, the chamber walls need not be of a high temperature plastic, but should still be of a lightweight material.

Figure 7:
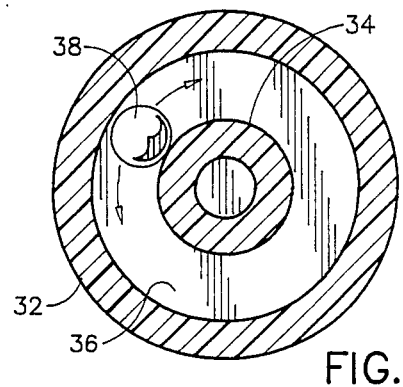
FIG. 7 is a horizontal cross-section on the line 7—7 through the chamber of FIG. 6.
Figure 8:
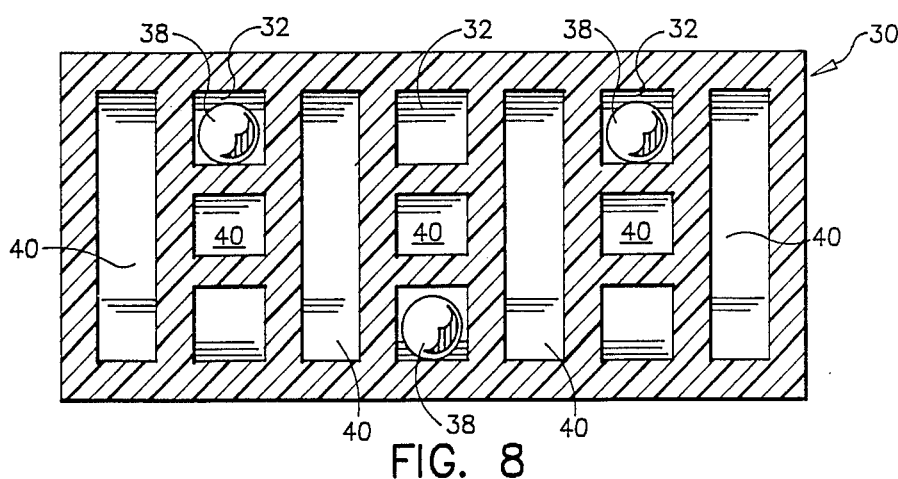
FIG. 8 is a vertical cross-section through a sound producing device according to another embodiment of the invention, incorporating chambers of the type shown in FIGS. 6 and 7.

FIGS. 6 to 8 show an alternative embodiment of the sound producing device according to the invention. The device 30 shown in FIG. 8 comprises a series of three spaced ball containing chambers 32, each of the chambers being of a flat, disc-like shape with a hollow center post 34 defining an annular passageway 36 in which a single ball 38 is located. An individual disc chamber is shown in more detail in FIGS. 6 and 7. Air chambers 40 are provided between the ball chambers and at opposite ends of the device.

The material used for the chamber walls in this embodiment will be of the same type as described above in connection with FIGS. 2 to 5, and the device can be made in a similar manner. In one preferred example, each disc chamber had a diameter of about 3 mm and a height of about 1.25 mm, while the central post formed an annular channel of width 1.25 mm. As in the previous embodiment, the ball 38 had a diameter of around 1 mm. Thus it can be seen that each ball 38 in each of the chambers 36 is constrained to roll in an annular path around the passageway and cannot rattle or bounce against the walls of the enclosing chamber.

Although three such chambers are provided in the sound producing device of FIG. 8, a greater or lesser number of such chambers may be included in alternative devices to produce different sound effects. The chambers are separated by correspondingly disc-shaped air filled chambers or cavities 40, which in the preferred embodiment have a thickness of approximately 1.25 mm. Air chambers 40 are also provided at the opposite ends of the device 30. The ball and air chambers may be formed separately and then laminated together, or the overall device shown in FIG. 8 may be molded in two separate longitudinal halves before loading the balls into the appropriate chambers and then joining the two halves together.

It has been found that the sounds produced by this embodiment are similar to the high frequency buzzing tones produced by the circular dome chamber of FIGS. 2 to 5. The addition of more ball chambers and air chambers increases the intensity and range of harmonics possible. The sound producing device of this embodiment will be embedded in the fishing lure body in the manner described above in connection with the first embodiment, and at an equivalent location in the fishing lure body to ensure that the movement of the body is not significantly damped while positioning the device in an area of the body which will be subject to a large degree of movement with the surrounding water.

Figure 9:
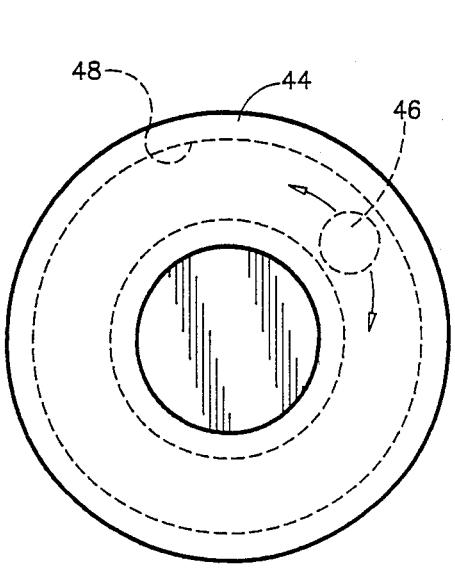
FIG. 9 is a top plan view of another chamber for forming part of the sound producing device for embedding in a fishing lure according to another embodiment of the invention.
Figure 10:
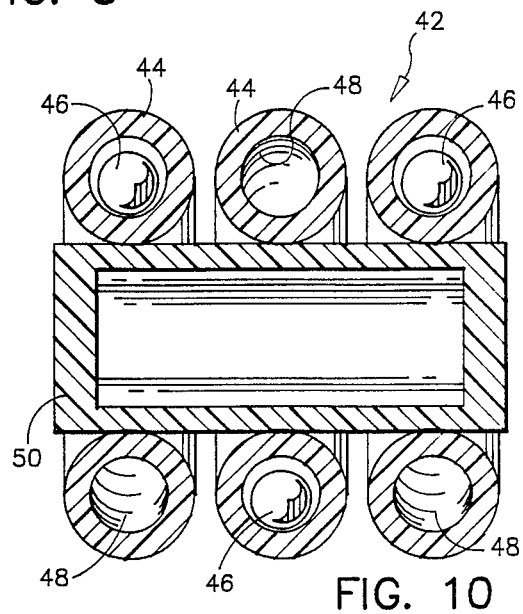
FIG. 10 is a vertical cross-section through a sound producing device incorporating chambers of the type shown in FIG. 9.

FIGS. 9 and 10 show another alternative embodiment of a sound producing device 42 according to the invention. In this device the ball chambers 44 are of circular donut shape and each contain a single ball 46. Each of the donut chambers 44 defines a circular cross-section passageway 48 in which the ball 46 is constrained. In the preferred arrangement, several donut chambers are arranged to surround a hollow tubular air chamber 50. Although three chambers 44 are shown surrounding the chamber 50 in FIG. 10, clearly a greater or lesser number of ball chambers may be used in alternative arrangements of the sound producing device 42, according to the shape and dimensions of the fishing lure body in which it is to be used and the amplitude of sound required.

In one specific example the air and ball chambers of the device shown in FIG. 10 are made of equivalent lightweight plastics material to the embodiments of FIGS. 2 to 8. The donut chambers are suitable of an overall external diameter of about 4 mm, and the passageway diameter is of the order of 1.25 mm. The hollow air chamber has a diameter of about 1.25 mm. and the balls, which may be of metal, glass or hard plastic as in the previous embodiments, are of approximately 1 mm diameter. The chamber wall thickness is suitably of the order of 0.8 to 1 mm.

The chambers 44 and 50 may be constructed separately, or alternatively, the overall device shown in FIG. 10 may be molded in two halves which can be fused or bonded together after loading the balls into the appropriate chambers.

The operation of an artificial fishing lure incorporating one of the sound producing devices discussed above will now be described in more detail. The fishing lure is of a soft plastic material which has a gelatin-like motion when stimulated by external movement. Thus, when the lure is suspended from a fishing line in a body of water, it will tend to move with the water motion and with movement of the fishing rod. If a suitable sound producing device is embedded in the lure, sounds will be emitted from it as it moves, which may tend to attract predator fish.

The sound producing devices of this invention are all designed so that they are not very heavy or dense and will therefore not damp the natural movement of the lure significantly. At the same time, they are also designed to produce sounds which are relatively similar to those produced by the natural prey of predator fish, for example on moving through the water or crawling on the bottom of a body of water.

Because of the very small size and weight of the sound producing device, it can in practice be embedded anywhere in the length of the lure without significantly affecting its motion. However, it is desirable that the sound producing device is located at a point where it can take full advantage of the natural movement of the lure. Thus, in FIG. 1 the device is shown at intermediate point in the length of a worm-like artificial lure, so that it is located at a position of relatively high movement while not significantly damping the lure movement. If it was too close to the end of the lure attached to the line, where only a small degree of movement would occur, the sound produced would not be sufficient. If it was embedded at the free end of the lure, the movement would be damped more by the weight of the device. Thus the position shown in FIG. 1 is a good location for elongate worm-like lures both for substantially maintaining the natural buoyancy and movement of the lure and for exposing the sound producing device to a large degree of sound producing movement. However, for lures an "action tail" such as a shad bait, the sound producing device would be positioned in the tail portion of the bait, which is thicker and undergoes a large degree of motion.

As discussed above, the sound producing devices themselves are all designed to produce a high frequency buzzing noise as the balls roll around their constraining chambers. Thus the size of the chamber or cavity is not much greater than that of the ball, so that the ball is not free to bounce around against the chamber walls but instead must roll over the wall surface. In the preferred arrangements the chamber is of a flattened, generally rounded shape and the maximum height of the chamber is no greater than twice the diameter of the ball. The intensity of the sound radiated from such a chamber is intensified in the embodiments described above by incorporating sealed air chambers in the device, which act as resonators to enhance the sound radiating property of the device.

When the sound producing device of this invention is excited by the motion of the plastic fishing lure in which it is embedded, the balls in the respective ball chambers will start to roll or spin around the chamber walls, emitting a high frequency whirring or buzzing sound. The hollow air chambers act as transfer amplifiers, and the sound is transferred through the lure body and out to the surrounding water.

It is believed that these noises resemble the natural sound of fish and crustaceans on which predator fish feed. It has been found that the catch, when using fishing lures in which the sound producing devices of this invention have been embedded, is significantly improved over the catch using traditional plastic lures with no sound producing devices.

The sound produced may be modified both by increasing the number of chambers, and also by varying the inside surface texture of the chamber walls to vary the intensity and harmonic range of the sound produced. It may also be varied by adjusting the component sizes. The sound producing device may be adapted to all soft plastic fishing lure forms and sizes.

Although some preferred embodiments of the invention have been described above by way of example, it will be understood by those skilled in the field that modifications may be made to the disclosed embodiments without departing from the scope of the invention, which is defined by the appended claims.

I claim:

1. An artificial fishing lure, comprising:
   a bait-shaped, generally solid lure body of soft, flexible plastics material;
   a sound producing device embedded and completely enclosed within the soft plastics material of the lure body, the device having at least one chamber having a generally circular outer periphery and an axial length less than its outer diameter;
   a single ball located within the chamber, the axial length of the chamber being not greater than twice the diameter of the ball;
   the chamber comprising means for constraining the ball against rattling against the walls of the chamber and for guiding the ball to roll around the walls of the chamber with movement of the body.

2. The lure according to claim 1, wherein the axial length of the chamber is not greater than twice the diameter of the ball.

3. The lure according to claim 1, in which the chamber is of circular dome-shape.

4. The lure according to claim 1, in which the chamber has an annular cavity for guiding the ball to follow an annular rolling path around the cavity.

5. The lure according to claim 4, in which the chamber is donut shaped.

6. The lure according to claim 4, in which the chamber is disc-shaped and has a central post for defining the annular cavity.

7. The lure according to claim 4, in which the cross-sectional area of the annular cavity is slightly greater than that of the ball.

8. The lure according to claim 1, in which the chamber walls are of a rigid, lightweight plastics material.

9. The lure according to claim 1, in which the sound producing device has a plurality of adjacent chambers, each containing one ball.

10. The lure according to claim 9, wherein the chambers are separated by hollow air filled cavities.

11. The lure according to claim 1, wherein the lure body is of elongate shape and the sound producing device is embedded at an intermediate point in the length of the lure.

12. The lure according to claim 1, wherein the ball has a diameter of approximately 1 mm and the chamber diameter is between 2 and 3 mm.

13. The lure according to claim 11, wherein the chamber has an annular internal cavity in which the ball is located, the annular cavity having a width and height of approximately 1.25 mm.

14. The lure according to claim 12, wherein the axial height of the chamber is approximately 2 mm.

15. The lure according to claim 1, in which the sound producing device includes at least one air filled cavity adjacent the ball containing chamber.

16. The lure according to claim 15, in which the chamber is of circular dome shape and the sound producing device comprises two dome shape chambers, each containing a single ball with a disc shaped air cavity between the chambers.

17. The lure according to claim 15, in which the chamber is of circular dome shape and the sound producing device comprises an outer tube of diameter slightly greater than that of the dome chamber, and a plurality of circular dome shape chambers, each containing a single ball located in the tube with an air gap between adjacent chambers and at opposite ends of the tube.

18. The lure according to claim 15, in which the chamber is of disc-shape and has a central hollow post defining an annular passageway in which the ball is located, and the sound producing device comprises a plurality of disc-shaped chambers, each having an annular passageway containing a single ball, the chambers being arranged end to end in coaxial relationship and the device having a disc-shaped air cavity between each adjacent pair of chambers and at opposite axial ends of the device.

19. The device as claimed in claim 18, wherein the member has three adjacent cavities, the outer two cavities being identical and each containing a single ball and the central cavity comprising an air filled cavity.

20. The lure according to claim 15, in which the chamber is of donut-shape, the sound producing device comprising a hollow air filled tube of diameter slightly less than the inner diameter of the donut-shaped chamber, and a plurality of donut shaped chambers each containing a single ball, the chambers being spaced apart with the air filled tube extending through their central openings.

21. An artificial fishing lure, comprising:
a bait-shaped, generally solid lure body of soft, flexible plastics material;
a sound producing device embedded and completely enclosed within the flexible plastics material of the lure body, the device comprising an enclosure having at least one internal ball chamber having a generally circular outer periphery and an axial length less than its outer diameter, and at least one separate air-filled chamber adjacent the ball chamber;
a single ball located within the ball chamber, the axial length of the chamber being not greater than twice the diameter of the ball;
the chamber comprising means for constraining the ball against rattling against the walls of the chamber and for guiding the ball to roll around the walls of the chamber with movement of the body.

22. An artificial fishing lure, comprising:
a bait shaped lure body of soft, flexible plastics material;
a sound producing device embedded within the lure body, the device comprising two circular dome shape chambers each having an axial length less than its outer diameter with a disc shaped air cavity between the chambers;
each chamber containing a single ball, the axial length of the chamber being not greater than twice the diameter of the ball; and
each chamber comprising means for constraining the ball against rattling against the walls of the chamber and for guiding the ball to roll around the walls of the chamber with movement of the body.

23. An artificial fishing lure, comprising:
a bait shaped lure body of soft, flexible plastics material;
a sound producing device embedded within the lure body, the device comprising an outer tube and a plurality of circular dome shape chamber within the tube, each chamber having an axial length less than its outer diameter, and an air gap between adjacent chambers and at opposite ends of the tube;
each chamber containing a single ball, the axial length of the chamber being not greater than twice the diameter of the ball;
the chambers comprising means for constraining the ball against rattling against the walls of the chambers and for guiding the ball to roll around the walls of the chambers with movement of the body.

24. An artificial fishing lure, comprising:
a bait shaped lure body of soft, flexible plastics material;
a sound producing device embedded within the lure body, the device comprising a plurality of disc-shaped chambers arranged end to end in coaxial relationship, each chamber having a central hollow post defining an annular passageway and a single ball within the passageway, and a disc-shaped air cavity between each adjacent pair of chambers;
each chamber having axial length less than its outer diameter and not greater than twice the diameter of the ball;
the chambers comprising means for constraining the ball against rattling against the walls of the chamber and for guiding the ball to roll around the walls of the chamber with movement of the body.

25. An artificial fishing lure, comprising:
a bait shaped lure body of soft, flexible plastics material;
a sound producing device embedded within the lure body, the device comprising a plurality of donut shaped chambers each containing a single ball, and a hollow, air-filled tube extending through the central openings of the chambers;
each chamber having an axial length less than its outer diameter and not greater than twice the diameter of the ball;
the chambers comprising means for constraining the ball against rattling against the walls of the chambers and for guiding the ball to roll around the walls of the chambers with movement of the body.

* * * * *